United States Patent
Apel et al.

(10) Patent No.: US 6,851,333 B2
(45) Date of Patent: Feb. 8, 2005

(54) SMART ACCELERATOR PEDAL

(75) Inventors: Peter Apel, Suedkirchen (DE); Klaus Wilczek, Werne (DE)

(73) Assignee: AB Elektronik GmbH, Werne (DE)

( * ) Notice: Subject to any disclaimer, the term of this patent is extended or adjusted under 35 U.S.C. 154(b) by 211 days.

(21) Appl. No.: 10/348,619

(22) Filed: Jan. 21, 2003

(65) Prior Publication Data

US 2003/0172767 A1 Sep. 18, 2003

(30) Foreign Application Priority Data

Mar. 13, 2002 (DE) .......................................... 102 11 018

(51) Int. Cl.$^7$ ................................................ G05G 1/14
(52) U.S. Cl. ........................................... 74/513; 74/514
(58) Field of Search .................... 74/512–514; 477/115, 477/141

(56) References Cited

U.S. PATENT DOCUMENTS 6,151,984 A * 11/2000 Johansson et al. ............ 74/512
6,330,838 B1 * 12/2001 Kalsi ............................. 74/514
6,689,016 B2 * 2/2004 Apel ............................. 477/115

* cited by examiner

Primary Examiner—Chong H. Kim
(74) Attorney, Agent, or Firm—Milde & Hoffberg, LLP

(57) ABSTRACT

An accelerator pedal device includes at least one pedal element that can be moved about the center of rotation of a gas pedal, opposite a base element, and which has at least one retraction element, and at least one damper element to dampen the pedal actuation movement and the pedal retraction movement of the pedal element. A control unit is provided, connected to a sensor element, which controls the motor unit as follows:
  a) sensing, through the control sensor element, a condition that deviates from the prescribed normal condition;
  b) switching on the motor unit that generates a motor counterforce that acts upon the pedal element in addition to the damping force of the damper element; and
  c) switching off the motor unit when the prescribed normal condition is sensed by the control sensor element.

8 Claims, 4 Drawing Sheets

SMART ACCELERATOR PEDAL

FIELD OF THE INVENTION

The invention relates to an accelerator pedal control device that includes a control unit connected to a sensor element, for controlling the accelerator pedal in relation to a prescribed normal condition.

BACKGROUND OF THE INVENTION

Accelerator pedal control devices having a damper element used to dampen the pedal actuation movement and the pedal retraction movement of the pedal element, and a control unit connected to a sensor element, to further dampen the pedal actuator movement under specific conditions, are known. A device of this type mentioned above is known from DE 298 05 253 U1. There, the pedal is connected to a piston rod of a piston of a hydraulic cylinder. Its cylinder element is filled with a hydraulic liquid. A hydraulic line is connected to the cylinder element beyond the highest and lowest position of the piston. A hydraulic valve, which is controlled by a decision logic, is located in the hydraulic line. The decision logic is designed as a programmable computing unit. Connected to the microcomputer unit is a distance sensor. The valve is controlled corresponding to the distance measured by the sensor, which in turn controls the flow of the hydraulic oil.

Though use of the valve makes actuation of the gas pedal element more difficult by reducing the flow rate of the hydraulic oil, the uniform rise of the required exertion of force is not sufficient to alert the motorist of a dangerous situation. In addition, the design of the accelerator pedal with the controllable hydraulic cylinder is too elaborate.

SUMMARY OF THE INVENTION

It is, therefore, a principal objective of the present invention to provide a less elaborate and more effective device of the type mentioned above.

These objects, as well as other objects which will become apparent from the discussion that follows, are achieved, in accordance with the present invention, by providing an accelerator pedal control device which comprises a motor unit, provided with a rotor unit connected to the pedal element, and a stator unit connected to the base unit, wherein the motor unit is connected to a control unit, and the control unit controls the motor unit by:

a) sensing a condition that deviates from the prescribed normal condition, through the control sensor element.

b) switching on the motor unit that generates a motor counterforce that acts upon the pedal element in addition to the damping force of the damper element, and c) Switching off the motor unit when the prescribed normal condition is sensed by the control sensor element.

The pedal element may be connected to the rotor unit of the motor, and the base unit to the stator unit of the motor. The pedal element may be connected to the base unit via connecting link elements. The connecting link elements can be cable pulls, gears or the like thereof.

The motor unit can be a torque motor, may be located at the center of rotation of the gas pedal, with its rotor unit connected to the pedal element and its stator element positioned in the base unit. Thus, the torque motor can be used as a motor without any intermediate gearing. By installing the torque motor at the center of rotation of the gas pedal and directly onto the base unit, its effectiveness is increased and the overall design of the accelerator pedal is simplified.

The control sensor element may be designed as a sensor for various dangers. For example, the control sensor element may be a speed sensor, a distance sensor, a temperature sensor, or the like thereof. It is also possible to connect all sensor models to the control unit. This increases the comfort of the smart accelerator pedal.

The control unit may be a microcomputer unit with an $E^2PROM$ memory for entering the normal condition. The $E^2PROM$ memory constitutes a read only memory with the attributes of a ROM with regard to overwrite ability. In this manner, it is possible to enter the various normal conditions. With regard to the readout of the written values for the normal condition, the $E^2PROM$ acts like a read only memory, however, with regard to writing in the various normal conditions, it acts like a RAM. Typical conditions may be, a) a prescribed speed limit, b) a prescribed safety distance, and c) an ice-formation temperature or the like. The normal conditions are not limited to the three mentioned above.

The base unit of the gas pedal can be a floor plate of the accelerator pedal device.

The pedal element may comprise a pedal lever element and an accelerator pedal element. The pedal lever element may be connected to the floor plate and moveable about the center of rotation of the gas pedal. The accelerator pedal element can be connected to the pedal lever element, and moveable about the center of rotation of the accelerator pedal. This allows for a comfortable operation.

The advantages achieved with the invention consist especially in the suddenness with which, the motor unit places a counterforce against the foot actuation force of the motorist. In this manner, the motorist is alerted to a dangerous situation and is able to react appropriately. If the motor unit is again switched off, the counterforce is, just as suddenly, no longer present. In this manner, the motorist is alerted of the fact that the dangerous situation is rectified. In addition, the design is less elaborate and more effective than prior designs.

For a full understanding of the present invention, reference should now be made to the following detailed description of the preferred embodiments of the invention as illustrated in the accompanying drawings.

DESCRIPTION OF THE PREFERRED EMBODIMENTS

Figures 1, 2:
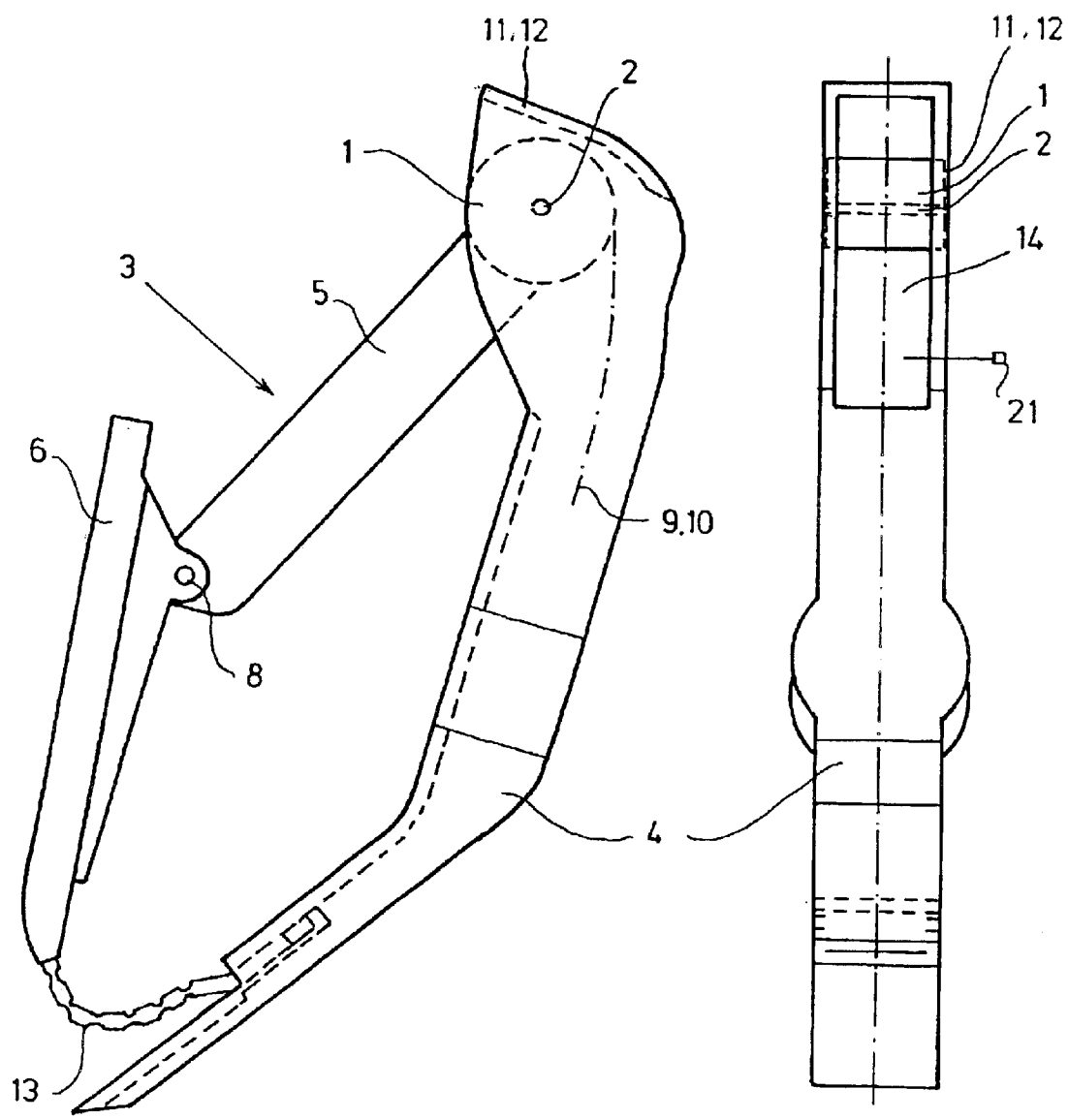
FIG. 1 shows a schematic side view of an accelerator pedal according to the invention with a built-in torque motor.
FIG. 2 shows a schematic bottom view of the accelerator pedal of FIG. 1.

The preferred embodiments of the present invention will now be described with reference to FIGS. 1–5 of the drawings. Identical elements in the various figures are designated with the same reference numerals.

Figure 3:
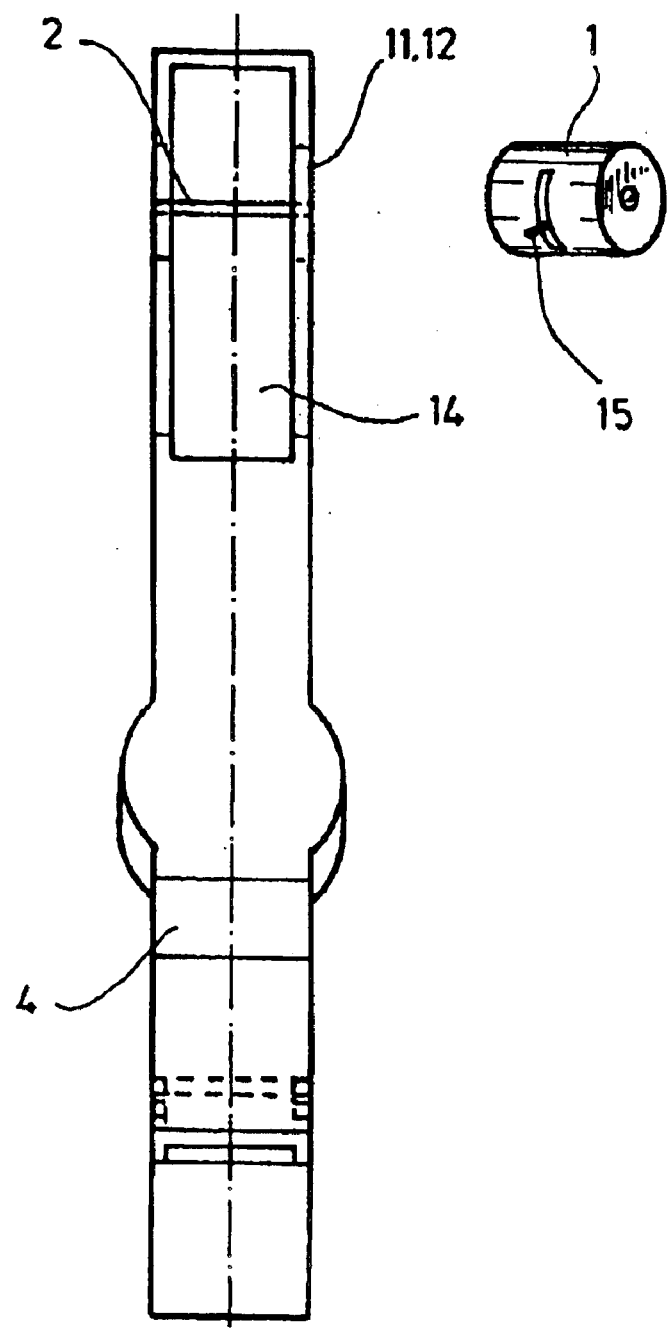
FIG. 3 is an exploded schematic bottom view of the accelerator pedal of FIG. 2, with torque motor arranged for insertion therein.
Figure 4:
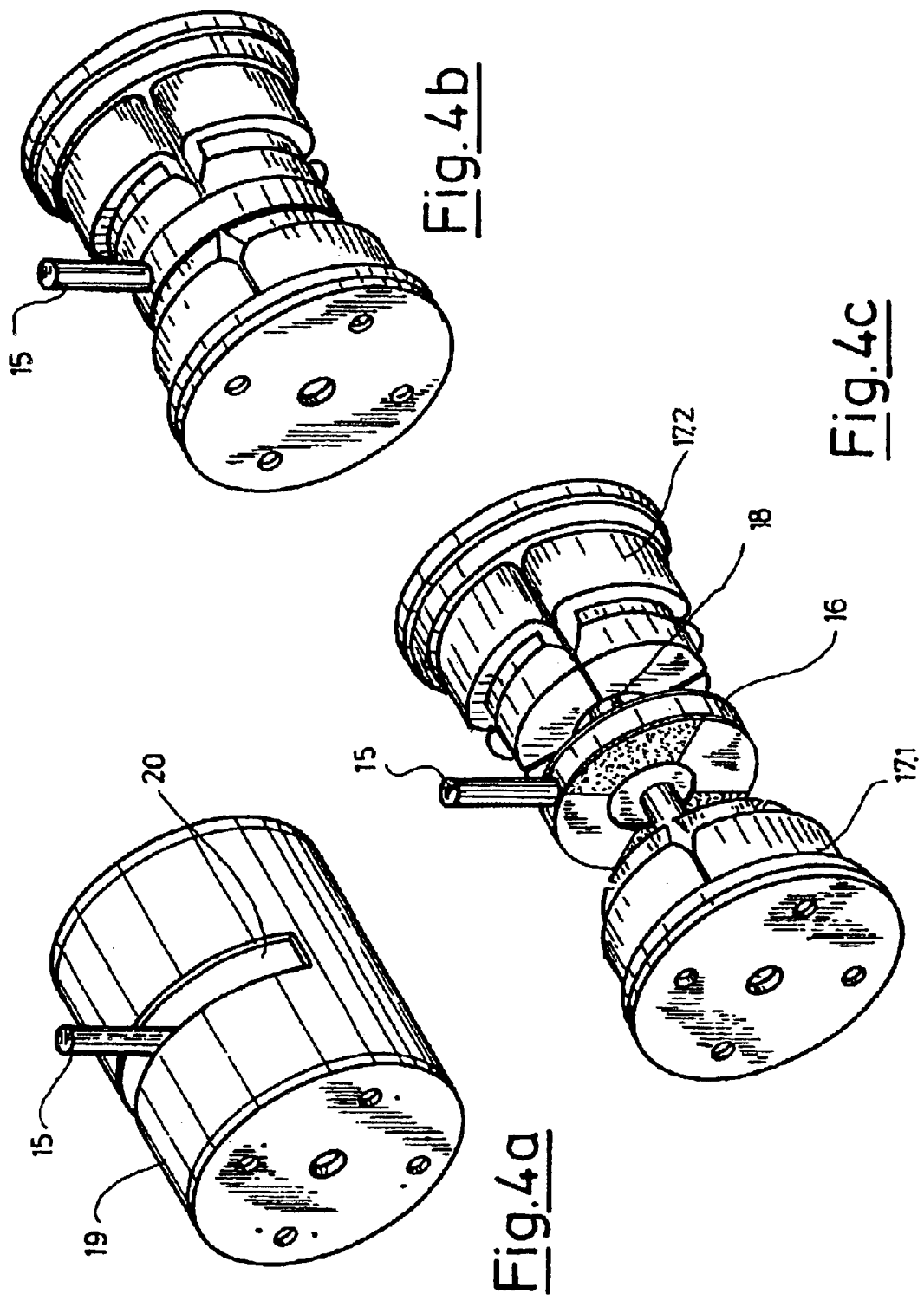
FIG. 4a is a schematic, perspective view of a torque motor employed in the accelerator pedal of FIGS. 1 to 3.
FIG. 4b is a schematic, perspective view of the torque motor of FIG. 4a with a housing removed.
FIG. 4c is a schematic, exploded, perspective view of the torque motor of FIG. 4b.

FIGS. 1 to 3 show a smart accelerator pedal. It consists of a pedal lever element 5, rotatably attached, at the center of rotation of the gas pedal 2, to the floor plate 4. An accelerator pedal element 6 is rotatably attached to the pedal lever element at a center of rotation of an accelerator pedal 8. The other end of the accelerator pedal element 6 is connected to the base unit 4 via a link coupling element 13. This ensures that the accelerator pedal element 6 is always positioned properly in relation to the foot of the motorist. The pedal lever element 5, and thus the accelerator pedal element 6, is always returned to its initial position with the help of two retraction elements 11, 12.

Figure 5:
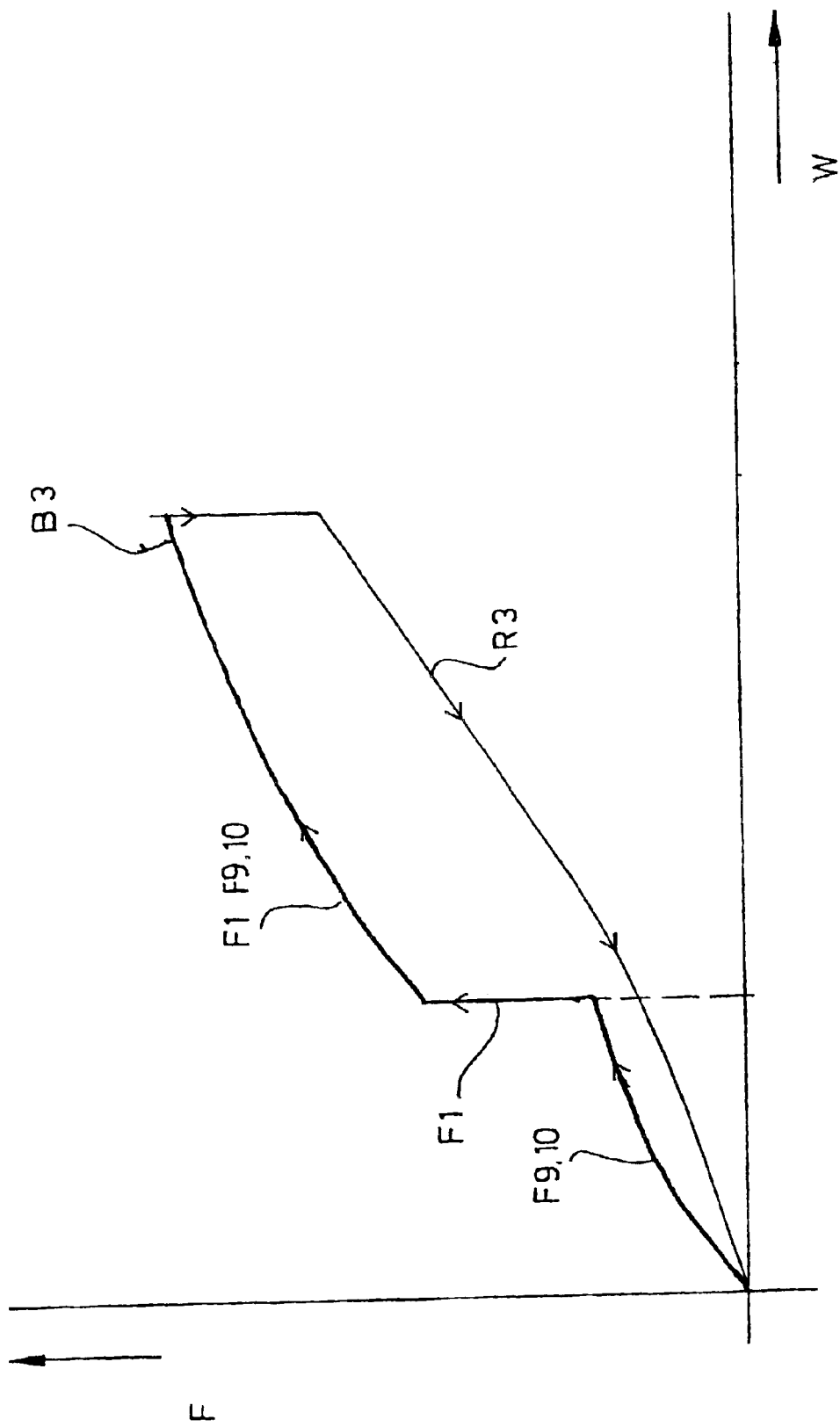
FIG. 5 shows the profile of a pedal path of an actuated accelerator pedal element with a torque motor corresponding to the path.

Two damper elements 9, 10 provide the damping of the actuation of the pedal lever element using the accelerator pedal element 6. The two damper elements generate a damping force F9, 10 that counteract the actuation motion of the motorist, as shown in FIG. 5. The curve F9,10 is slightly arched because of the braking force of the damper elements 9, 10.

The two damper elements 9, 10 can be designed as braking cables that are guided over rough surfaces that may exhibit varying roughnesses.

A torque motor 1 is provided at the center of rotation of the gas pedal 2. In this manner, it can best deploy its effect. The torque motor offers the advantage that it can be employed without a transmission gear.

In addition, the torque motor is located on the inside of the floor plate 4 This prevents damage to the torque motor when the accelerator pedal is actuated by the foot of the driver.

The torque motor is shown in FIGS. 4a to 4c. At its rotor unit, it exhibits a disk-shaped, grooved torque motor rotor 16 with a thin width in relation to its large diameter. A pedal peg 15 is attached to the rotor 16. This peg connects the rotor to the pedal lever element 5.

One stator half 17.1, is located to the left and one stator half 17.2 is located to the right of the rotor 16. The rotor 16 moves between the two stator halves by means of a motor shaft 18.

The composite view of the torque motor 1 is shown in FIG. 4b.

As shown in FIG. 4a, a housing element 19 is at least partially slid over the two stator halves to point 1, to point 2. A slot opening 20, where the pedal peg 15 has accordingly free movement, is provided in the housing element 19.

The rotational speed range of the torque motor 1 is between 1 RPM and approx. 1,200 RPM and for a high torque is therefor suitable for direct connection without interim gearing.

The torque motor 1 is connected to a microcomputer unit 14 with an $E^2PROM$. In addition, a control sensor element 21 is located at the microcomputer unit 14. The control sensor element 21 can be designed as a speed sensor, a distance sensor, a temperature sensor or the like thereof.

The operation of the smart accelerator pedal as it results from the presented exemplary embodiment shall be described.

By actuating the pedal lever element 5, the motorist actuates the accelerator pedal element 6 of the vehicle. The two damper elements 9, 10 oppose this movement with a damping force F9, 10, as shown in FIG. 5. This means, the stronger and more intensive the accelerator pedal element 6, and thus the pedal lever element 5, is actuated, the greater the damping force F9, 10 will be.

Before the motorist enters the highway, he has entered the prescribed recommended speed of 130 km/h into the $E^2PROM$. Vehicles traveling along with him may tempt him to exceed the prescribed speed limit of 130 km/h, the prescribed normal condition. The control sensor element senses this violation and passes this information on to the microcomputer unit 14. The microcomputer unit 14 compares the actual value with the prescribed normal value and initiates the immediate activation of the torque motor 1. The torque motor 1 develops a torque motor force F1 with a linearly increasing effect, as shown in FIG. 5.

By the sudden increase in the damping force, which now consists of the torque motor force F1 plus the damping force F9, 10, the motorist is abruptly made aware of the violation of the prescribed normal condition. If he still does not desist from the continued actuation of the accelerator pedal element, and thus of the pedal lever element 5, he will have to overcome the sum of both forces F1 plus F9, 10.

This leads to him releasing the foot from the gas pedal after a short period. This inevitably reduces the speed. The control sensor element senses this change. The torque motor shuts off as soon as the normal condition is reached, and the two damper elements 9, 10 oppose the actuation force.

If the foot is removed entirely from the accelerator pedal element 6, and thus the pedal lever element 5 is returned by the two retracting elements, which are designed as springs, the damping force F9, 10 of the two damper elements only partially opposes this retraction movement, such that a curve profile results, which is shown in FIG. 5 by the pedal retraction movement R3.

There has thus been shown and described a novel accelerator pedal device which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An improvement in an accelerator pedal device having
   a) a gas pedal comprising a pedal element rotatably attached to a base unit, at the center of rotation of the gas pedal,
   b) at least one retraction element, and at least one damper element to dampen a pedal actuation movement and a pedal retraction movement of the pedal element, the improvement comprising:
      i) a motor unit, comprising a rotor unit connected to the pedal element, and a stator unit connected to the base unit, said motor unit being capable of generating a motor counterforce that acts upon the pedal element, said motor unit being connected to
      ii) a control unit, comprising
         A) a control sensor element for sensing a specified condition,
         B) means for comparison with a prescribed normal condition, and
         C) means for switching the motor unit on and off, which controls the motor unit by:
            1) sensing, through the control sensor element, a condition that deviates from a prescribed normal condition, 2) switching on the motor unit to generate a motor counterforce that acts upon the pedal element in addition to the damping force of the damper element, 3) switching off the motor unit when the prescribed normal condition is sensed by the control sensor element.

2. A device as set forth in claim 1, wherein the pedal element is connected to the base unit via connecting link elements.

3. A device as set forth in claim 1, wherein the motor unit is a torque motor located at the center of rotation of the gas pedal.

4. A device as set forth in claim 1, wherein the control sensor element is selected from the group consisting of: a speed sensor, a distance sensor, a temperature sensor, or the like.

5. A device as set forth in claim 1, wherein the control unit comprises a microcomputer with an $E^2PROM$ memory for entering the prescribed normal condition.

6. A device as set forth in claim 1, wherein the prescribed normal condition is selected from the group consisting of: a prescribed speed limit, a prescribed safety distance, an ice-formation temperature or the like.

7. A device as set forth in claim 1, wherein the base unit is a floor plate.

8. A device as set forth in on claim 1, wherein the pedal element comprises a pedal lever element and an accelerator pedal element, wherein the pedal lever element is rotatably attached to the floor plate at the center of rotation of the gas pedal, and the accelerator pedal element is rotatably attached to the pedal lever element at the center of rotation of an accelerator pedal.

* * * * *